United States Patent
Klein et al.

(10) Patent No.: US 12,240,031 B2
(45) Date of Patent: Mar. 4, 2025

(54) METHOD FOR PRODUCING A DETENT PAWL

(71) Applicants: Feintool International Holding AG, Lyss (CH); ZF Friedrichshafen AG, Friedrichshafen (DE)

(72) Inventors: Julia Klein, Friedrichshafen (DE); Tobias Miller, Friedrichshafen (DE); Martin Meyer, Friedrichshafen (DE); Matthias List, Friedrichshafen (DE); Gilbert Fuerer, Walperswil (CH); Ulrich Schlatter, Kappelen (CH); Marco Soldati, Zollikofen (CH)

(73) Assignees: FEINTOOL INTERNATIONAL HOLDING AG, Lyss (CH); ZF FRIEDRICHSHAFEN AG, Friedrichshafen (DE)

( * ) Notice: Subject to any disclaimer, the term of this patent is extended or adjusted under 35 U.S.C. 154(b) by 412 days.

(21) Appl. No.: 17/772,252

(22) PCT Filed: Oct. 27, 2020

(86) PCT No.: PCT/EP2020/080167
§ 371 (c)(1),
(2) Date: Apr. 27, 2022

(87) PCT Pub. No.: WO2021/110327
PCT Pub. Date: Jun. 10, 2021

(65) Prior Publication Data
US 2022/0379365 A1 Dec. 1, 2022

(30) Foreign Application Priority Data
Dec. 5, 2019 (DE) .................... 10 2019 218 968.7

(51) Int. Cl.
*F16H 63/34* (2006.01)
*B21D 53/88* (2006.01)
*B23P 15/14* (2006.01)

(52) U.S. Cl.
CPC .............. *B21D 53/88* (2013.01); *B23P 15/14* (2013.01); *F16H 63/3425* (2013.01)

(58) Field of Classification Search
CPC ..... B21D 53/88; B23P 15/14; F16H 63/3425; F16H 63/3416; F16H 63/3433; B21K 23/00
See application file for complete search history.

(56) References Cited

U.S. PATENT DOCUMENTS

| 2011/0139572 A1 | 6/2011 | Nomasa et al. |
| 2011/0168519 A1* | 7/2011 | Stauber ............... F16H 63/3433 192/219.5 |
| 2014/0251750 A1* | 9/2014 | List ..................... F16H 63/3433 192/219.5 |

FOREIGN PATENT DOCUMENTS

| CN | 102886428 A * | 1/2013 |
| DE | 10 2018 206 016 A1 | 12/2018 |

(Continued)

OTHER PUBLICATIONS

Gu Y; CN-102886428-A; Jan. 23, 2013; CN; Machine Translation (Year: 2013).*

*Primary Examiner* — Lee A Holly
(74) *Attorney, Agent, or Firm* — Norris McLaughlin, P.A.

(57) ABSTRACT

Parking detent pawls are known which are suitable for securely holding a vehicle in a parked state. The aim of the invention is to provide a detent pawl for a parking lock which is characterized by a high degree of operational reliability. For this purpose, a method is proposed for producing a detent pawl with a latching section for engaging into a locking toothing, a support section for rotatably (Continued)

supporting the detent pawl about a rotational axis, and a locking section for resting against a locking bolt which can be moved along the detent pawl, having the following steps: providing a detent pawl blank; providing a shaping tool with a shaping contour, said shaping contour having a load section and a guide section; and shaping the detent pawl blank in a shaping direction by means of the shaping tool, wherein a depression for receiving the locking bolt is produced on the locking section, the load section defines a load region of the depression for supporting the locking bolt in a locking position, and the guide section defines a guide region of the depression for guiding the locking bolt during an actuation movement.

10 Claims, 6 Drawing Sheets

(56) References Cited

FOREIGN PATENT DOCUMENTS

| | | |
|---|---|---|
| DE | 10 2018 129 314 A1 | 10/2019 |
| EP | 2 508 274 A1 | 10/2012 |

* cited by examiner

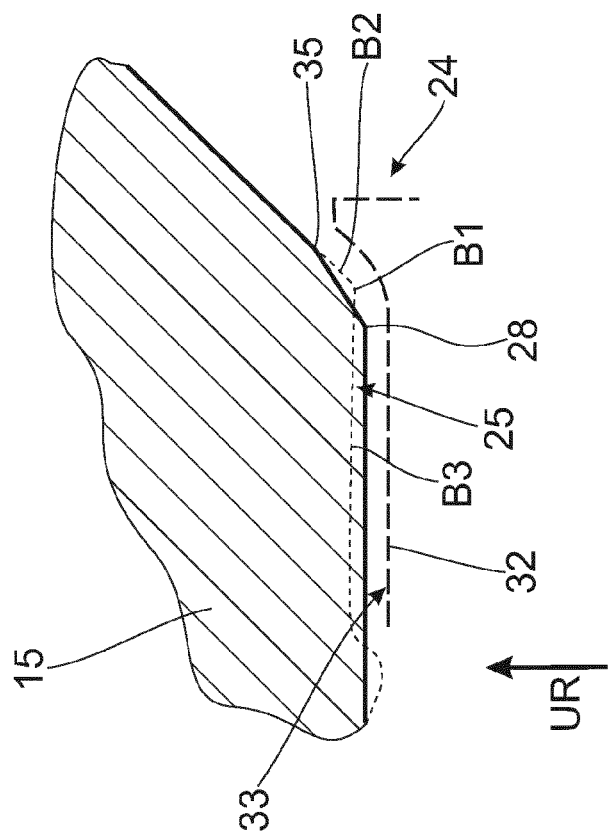
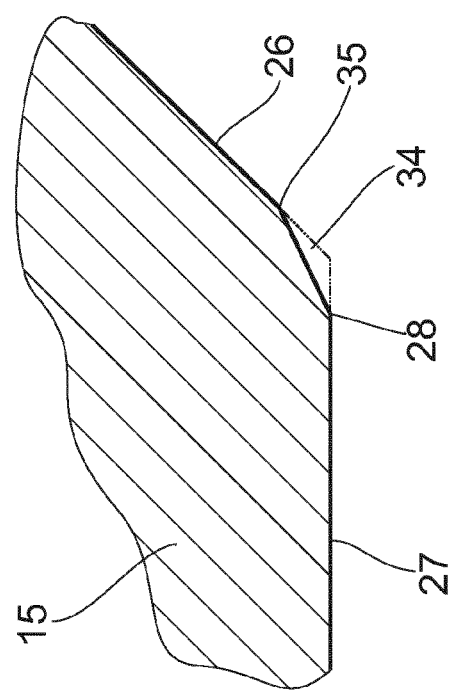
Fig. 5a
Fig. 5b

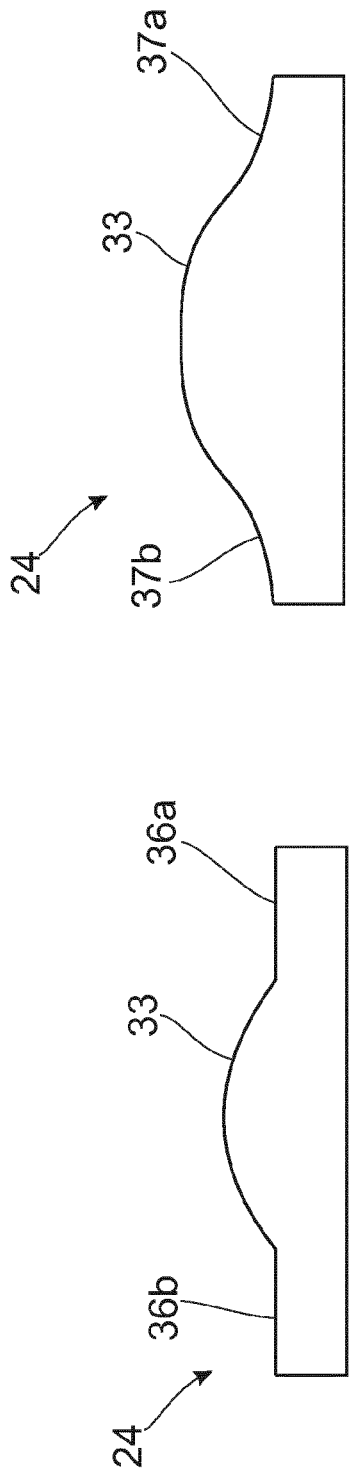

METHOD FOR PRODUCING A DETENT PAWL

Parking lock pawls are known which are suitable for securely holding a vehicle in a parked state, wherein, for this purpose, the parking lock pawl engages in a form-fitting manner in what is referred to as a parking lock wheel and secures the latter against rotation. In order to secure the parking lock pawl in a locking position, a locking element is provided which is displaceable between the parking lock pawl and a guide plate and holds the parking lock pawl in the parking lock wheel.

The document DE 102018206016 A1, which probably forms the closest prior art, discloses a parking lock for an automatic transmission in a motor vehicle, comprising a detent pawl which is mounted pivotably on a pawl journal and which engages with detent action into, or disengages from, a parking lock wheel which is connected to the output of the automatic transmission, and comprising a locking element which is arranged on a connecting rod to a selector disk and which is spring-loaded by means of a spring element and which, in the locked state, is clamped between the detent pawl and a guide plate in order to prevent the detent pawl from being pushed out of a tooth space of the parking lock wheel. That end of the connecting rod which is averted from the locking element is articulated on the selector disk which is rotated by an actuating device during the engagement and disengagement of the parking lock. It is proposed that the selector disk is mounted rotatably on the pawl journal, and that a hold-down spring is fastened to or mounted on the selector disk, which hold-down spring, in the disengaged state of the parking lock, prevents the detent pawl from touching the parking lock wheel.

The invention has been set the object of providing a method of the type mentioned at the beginning which is distinguished by particularly simple and rapid introduction of different functional surfaces on the detent pawl.

The invention relates to a method for producing a detent pawl. The detent pawl is designed and/or is suitable in particular for a parking lock of a vehicle and has the function of locking a transmission shaft and/or a drive train of the vehicle in order to secure the vehicle in a parked state against rolling away. The detent pawl is preferably produced from a metallic material, in particular a steel alloy.

The detent pawl has a latching portion which is designed and/or is suitable for engaging in a locking toothing. In particular, the locking toothing has a plurality of tooth intermediate spaces, wherein the latching portion engages and/or can be engaged in a form-fitting manner in one of the tooth intermediate spaces. The latching portion is preferably formed by a latching tooth which is complementary to the locking toothing.

The detent pawl has a bearing portion which is designed and/or is suitable for rotatably mounting the detent pawl about an axis of rotation. In particular, the bearing portion serves for receiving a bearing bolt, wherein the detent pawl can be mounted rotatably on the bearing bolt. The bearing portion is preferably designed as a cylindrical bore, in particular passage bore. In particular, the bearing portion is designed as what is referred to as a bearing eye. A main body of the detent pawl is preferably designed as a lever arm which, in an installation situation, comprises a mounted end and a free end, wherein the bearing portion is arranged at the mounted end.

The detent pawl has a locking portion which is designed and/or is suitable for contact with a locking catch which is movable along the detent pawl. In particular the locking catch runs onto the locking portion in order to pivot the detent pawl about the axis of rotation. For this purpose, the locking portion is preferably designed in the manner of a ramp in order to convert a linear movement of the locking catch into a rotational movement of the detent pawl about the axis of rotation. The locking catch is preferably displaceable axially along a locking catch axis between a release position and a locking position, wherein the locking catch axis, in particular in a projection from above, intersects the axis of rotation perpendicularly and/or is arranged axially parallel to a longitudinal axis of the detent pawl. In the release position, the locking portion lies on the latching catch in such a manner that the latching portion and the locking toothing are not in engagement. In the locking position, the locking portion lies on the latching catch in such a manner that the latching portion is in engagement with the locking toothing. The locking catch is preferably formed rotationally symmetrically with respect to the locking catch axis. In particular, the locking catch has a cylindrical and/or conical lateral surface portion. In particular, the locking catch is designed as a locking cone or a locking roller.

The locking portion is arranged on a side of the detent pawl averted from the latching portion. The locking portion is preferably arranged at the free end of the main body. For example, the locking portion is integrally formed in the form of a lug on the main body.

Within the context of the invention, it is proposed that the method comprises the following steps:
providing a detent pawl blank;
providing a forming tool with a forming contour, wherein the forming contour has a load portion and a guide portion;
forming the detent pawl blank by the forming tool in a forming direction, wherein a depression for receiving the locking catch is produced on the locking portion, wherein the load portion defines a load region of the depression for supporting the locking catch in a locking position, and wherein the guide portion defines a guide region of the depression for guiding the locking catch during an actuating movement.

In particular, the detent pawl blank has a shape close to the final contour. For example, the shape of the detent pawl blank close to the final contour can be formed by a production method, in particular a separating method, for example milling or cutting, or a primary forming method, for example sintering or casting. The treatment by the forming tool preferably takes place exclusively on the locking portion. The detent pawl blank is preferably machined in a forming machine, preferably a press, with the forming tool being designed as a punch. During the forming, the forming tool is advanced in a stroke movement in the forming direction to the detent pawl blank, in particular to the locking portion, and pressed with a forming force into the material of the detent pawl blank. For this purpose, the detent pawl blank is particularly preferably arranged and/or clamped flat or on edge in the forming machine and supported counter to the forming direction. The introducing of the load region and of the guide region preferably takes place in just one working step. Particularly preferably, however, the forming process takes place until a defined forming depth is reached and/or until the forming tool is located in a defined end position.

The advantage of the invention consists in particular in that, by means of the joint introduction of the load region and of the guide region, a depression which has different functional surfaces can be produced in just one working step. A further advantage of the method according to the invention consists in particular in that the depression can be introduced particularly simply and rapidly into the locking portion. In addition, the forming process enables a method which is particularly protective of materials to be proposed.

In a preferred refinement of the invention, it is provided that the locking portion has a lifting surface and a free floating surface. In particular, the lifting surface serves for the locking catch to run onto it in order to engage the detent pawl with detent action into, or to disengage same from, the locking toothing. For this purpose, the lifting surface has a lifting slope and is preferably designed as a ramp. In particular, the free floating surface has a free floating slope and is preferably designed as an undercut. The lifting surface and the free floating surface are preferably arranged at an angle to each other, as viewed in a side view, and are jointly connected to each other via a locking radius. The lifting surface and the free floating surface preferably extend perpendicular to a common plane which is preferably formed by a flat side of the detent pawl. In particular, the lifting surface extends in a first plane and the free floating surface in a second plane, wherein the first and the second plane intersect the longitudinal axis and/or the locking catch axis at an angle. In particular, the locking radius is formed by a rounded edge of the locking portion.

According to this embodiment, in order to form the depression, the load region is introduced by the load portion at the location of the locking radius, and the guide region is introduced by the guide portion at the location of the lifting surface. For this purpose, the forming tool is advanced in the forming direction to the detent pawl blank in such a manner that the load portion lies against or is introduced at the locking radius and the guide portion lies against or is introduced at the lifting surface. In order to form the load region, the locking radius is formed in the forming direction by the load portion such that a contour is produced which centers the locking catch in the load region in the locking position. In order to form the guide region, the guide portion produces an inlet which runs from the run-on surface toward the load region and via which the locking catch is guided during the actuating movement.

In a further embodiment, it is provided that the forming contour has a free floating portion. In particular, the free floating portion directly adjoins the load portion. In order to form the depression, a free floating region for the locking catch is additionally defined by the free floating portion, wherein the free floating region is introduced into the free floating surface by the free floating portion. For this purpose, the forming tool is advanced in the forming direction to the detent pawl blank in such a manner that the forming tool additionally lies with the free floating portion on the free floating surface or is introduced into the latter. In order to form the free floating region, an outlet which runs from the load region toward the free floating surface and via which the locking catch is guided during the actuating movement is produced by the free floating portion.

In a specific implementation, it is provided that the forming contour has a continuous contour profile, as viewed in a longitudinal section, in particular along the longitudinal axis. In particular, a "continuous contour profile" should be understood as meaning a profile extending uniformly and continuously. It can optionally be provided that the forming contour, as viewed in longitudinal section, roughly follows the contour of the locking portion in the region of the depression to be introduced and/or is adapted thereto. During the forming, a continuous and/or flowing transition between the load region and the guide region and optionally between the load region and the free floating region is thus produced. The method can therefore produce a depression which prevents catching of the locking catch and therefore increases the operational reliability of the detent pawl in an installation situation.

In a further implementation, it is provided that the load portion and the guide portion and optionally the free floating portion, have a curved contour profile, as viewed in a cross section. In particular, the load portion, the guide portion and optionally the free floating portion have a continuously curved contour profile. Preferably, during the forming at least in the load region, a beveling contour is produced by the curved contour profile, which beveling contour is suitable for adaptation to an outer circumference of the locking catch. It is provided here that at least the load portion and the guide portion have different radii of curvature. The guide portion particularly preferably has a larger radius of curvature than the load portion. It is optionally provided that the free floating portion and the load portion have the same or a different radius of curvature. In particular, the forming contour, in particular the load portion, has a radius of curvature which increases from the free floating portion toward the guide portion.

In a development, it is provided that a sectional contour of the detent pawl blank is produced in a cutting step by cutting in a cutting direction. In particular, the detent pawl blank is cutout from a feedstock in the cutting step by means of a cutting tool. In a forming step following the cutting step, the depression is produced by forming in the forming direction. The forming direction is directed transversely to the cutting direction or in the same direction as the cutting direction or opposed to the cutting direction. In particular, "directed transversely" should be understood as meaning that the forming direction and the cutting direction are perpendicular to each other. The orientation of the forming direction is dependent on the position or alignment of the detent pawl blank in the forming step. If, for example, during a transfer from the cutting step into the forming step, the detent pawl blank remains unchanged in its position, the forming direction is directed transversely to the cutting direction. If, however, during the transfer from the cutting step into the forming step, the detent pawl blank is tilted, the forming direction is likewise tilted by this amount relative to the cutting direction. In particular, during the transfer from the cutting step to the forming step, the detent pawl blank can be tilted by 90 degrees, wherein the forming direction is oriented counter to or in the same direction as the cutting direction depending on the tilting direction.

The load region, the guide region and optionally the free floating region are preferably formed in the locking portion in such a manner that an accumulation of material arising during the forming is formed laterally on the locking portion. For this purpose, the detent pawl blank can be restricted in respect of its degrees of freedom in the forming step in such a manner that the accumulations are produced exclusively or at least for the most part laterally on the locking portion.

It can optionally be provided that, in the cutting step, a supply of material for forming a deformable oversize for the depression formed in the forming step is produced. In particular, the supply of material, as viewed in a side view, is produced by a targeted excess on the locking portion, in particular on the locking radius. By means of the material which is additionally available, an increase in the forming surface can therefore be produced.

Alternatively, it can be provided that, in the cutting step, space is supplied for reducing an accumulation of material formed in the forming step. In particular the space is produced, as viewed in a side view, by a targeted undersize on the locking portion, in particular in a transition region from the load region to the guide region. By means of the reduction of the material in the transition region, the accumulation arising during the forming can be reduced in the transition region such that the contour profile of the depression is promoted.

In a specific development, it is provided that the sectional contour is produced in the cutting step by precision cutting. The precision cutting is distinguished in particular in that the feedstock is held during the cutting process by V-shaped projections. It is preferred that the cutting step and the forming step are carried out as different steps within the same working cycle.

Alternatively or optionally additionally, it is provided that the depression is produced in the forming step by compression forming. In particular, the compression forming corresponds to a method according to DIN 8583. The depression is preferably introduced into the locking portion by an impressing method with rectilinear movement. Particularly preferably, the depression is produced by stamping or countersinking.

In a further specification, it is provided that the forming tool has a flattened and/or offset contour profile on both sides, as viewed in a cross section. In particular, this enables production of a free region and/or a shoulder which laterally adjoins the forming contour in order to provide additional space for the accumulation of material generated during the forming and/or in order to deflect a flow of material in a desired direction. The accumulation of material during the forming is preferably formed laterally, in particular transversely to the longitudinal axis, on the locking portion.

In a preferred embodiment, it is provided that, with respect to the pawl width, the depression is partially introduced into the locking portion. Preferably, with respect to the pawl width, the depression is introduced centrally into the locking portion, in particular into the locking radius. In particular, by means of the curved contour profile of the forming contour, a width of the depression can be set depending on the forming depth, wherein, as the forming depth increases, the width of the depression increases with respect to the pawl width.

In an alternative embodiment, it is provided that the depression is introduced over the entire pawl width into the locking portion. In particular, the forming contour has a width which, in an end position, is greater than or equal to the pawl width. Particularly preferably, the forming contour or the depression has a constantly curved contour profile over the entire pawl width.

Further features, advantages and effects of the invention emerge from the description below of preferred exemplary embodiments of the invention. In the figures.

Figure 4:
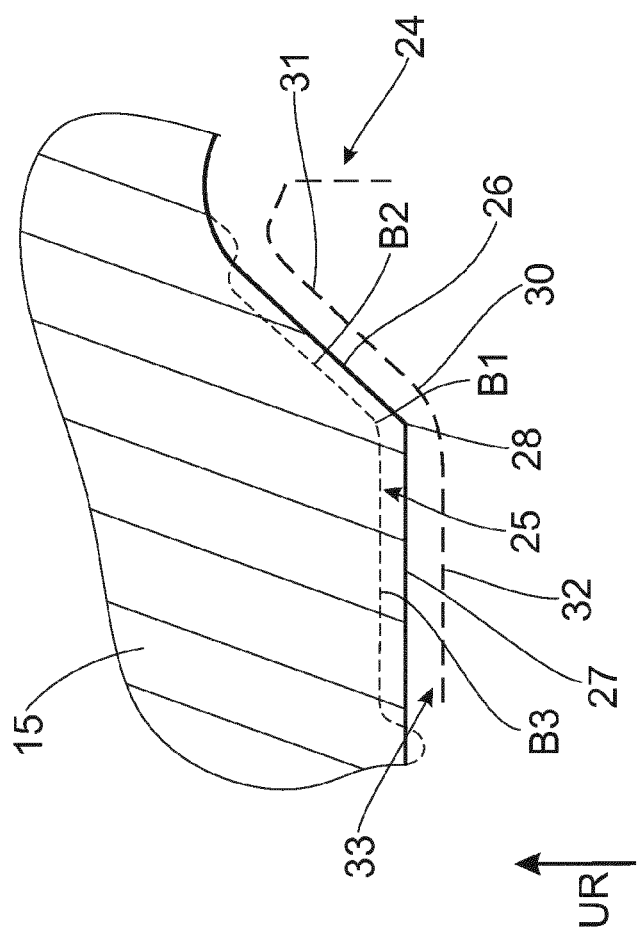
FIG. 4 shows a schematic detailed view of the detent pawl and of the forming tool from FIG. 3 in an alternative embodiment.

FIGS. 5a,b show the detent pawl and the forming tool in the same illustration as FIG. 4 in an alternative embodiment;

FIGS. 6a,b,c show, in a schematic cross section, the forming tool in different embodiments.

Figure 1:
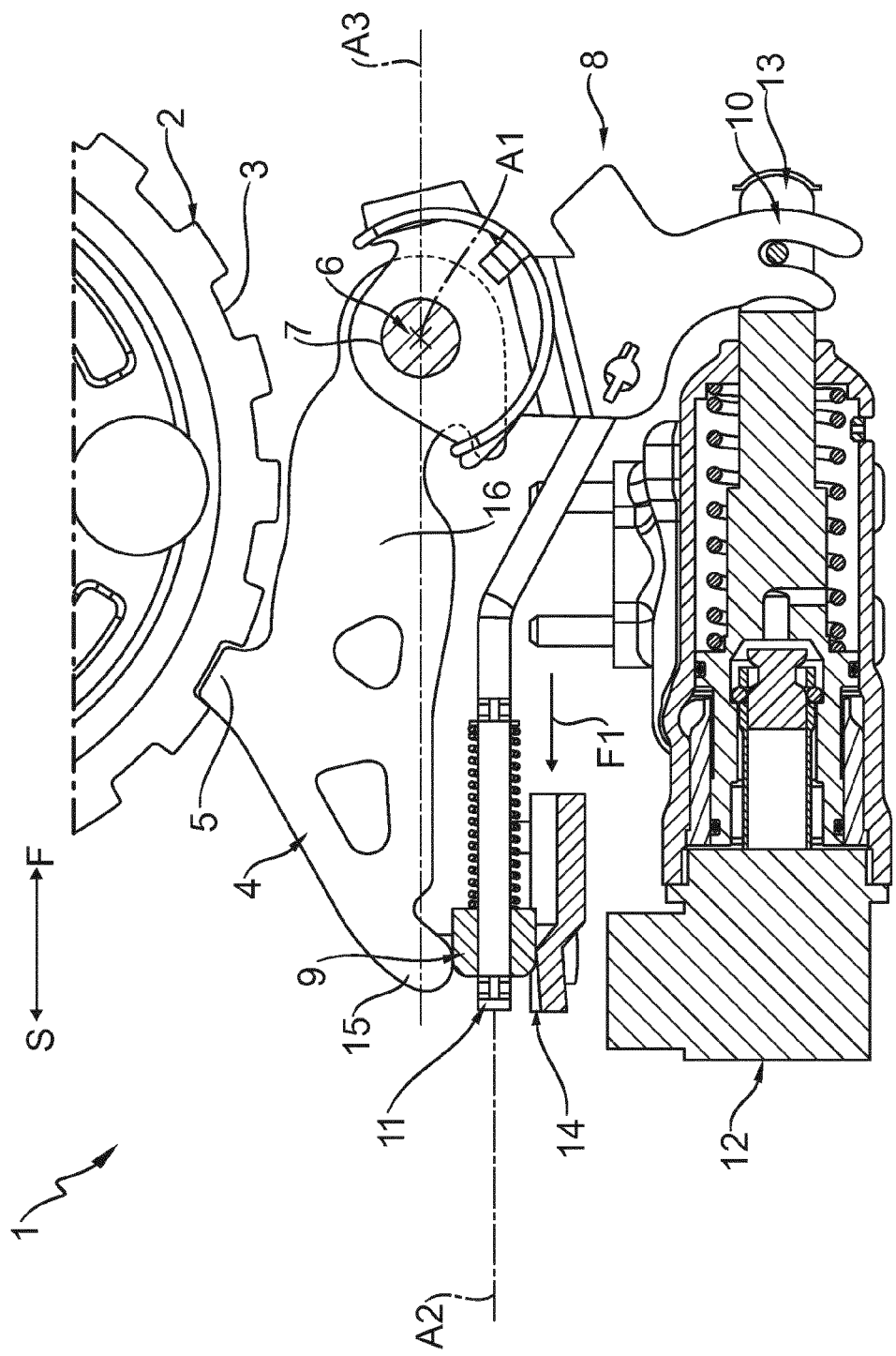
FIG. 1 shows a schematic illustration of a parking lock for a vehicle.

FIG. 1 shows, in a schematic illustration, a parking lock 1 for a vehicle transmission or an electric drive of a vehicle, not illustrated. The parking lock 1 serves to block an output of the vehicle transmission or of the electric drive in order to secure the vehicle in a parked state from rolling away.

For this purpose, the parking lock 1 has a parking lock wheel 2 which is connected for conjoint rotation to the output, in particular to a transmission shaft, of the vehicle transmission or of the electric drive. The parking lock wheel 2 is designed as a gearwheel and has a locking toothing 3 which is formed by a tooth geometry arranged on the outer circumference of the parking lock wheel 2. In order to lock the output, the parking lock 1 has a detent pawl 4 which is pivotable about an axis of rotation A1 and which can be brought into engagement with the locking toothing 3.

For this purpose, the detent pawl 4 has a latching portion 5, wherein, in an engaged state of the parking lock 1, the latching portion 5 engages in a tooth space of the locking toothing 3, as illustrated, and, in a disengaged state of the parking lock 1, is disengaged from the locking toothing 3. The latching portion 5 is designed as a pawl tooth which, in the engaged state of the parking lock 1, is arranged in a form-fitting manner in the tooth space.

For the mounting of the detent pawl 4, the parking lock 1 has a bearing bolt 6, wherein the detent pawl 4 is arranged mounted rotatably on the bearing bolt 6. For this purpose, the detent pawl 4 has a bearing portion 7, wherein, for the mounting of the detent pawl 4, the bearing bolt 6 is guided through the bearing portion 7. The bearing portion 7 is designed, for example, as a cylindrical passage bore and, with its center axis, defines the axis of rotation A1.

Furthermore, the parking lock 1 comprises a shift lever arrangement 8 and a locking catch 9, wherein, for the movement of the locking catch 9, along a locking catch axis A3, the shift lever arrangement 8 is pivotable about the axis of rotation A1. The shift lever arrangement 8 has a shift lever 10 and a connecting rod 11, wherein the connecting rod 11 is on the one hand arranged in an articulated manner on the locking lever 10 and serves on the other hand for receiving the locking catch 9. The locking catch 9 is arranged movably on the connecting rod 11 in the axial direction with respect to the locking catch axis A2 between a release position F and a locking position S, wherein the locking catch 9 is subjected to a spring force Fl in the direction of the locking position S. For example, for this purpose, the locking catch 9 is supported in an axial direction on the connecting rod 11 via a compression spring, in particular a helical spring.

The parking lock 1 has an actuating actuator 12 for producing the actuating movement, wherein the actuating actuator 12 is coupled in terms of movement to the shift lever 10 in order to transmit the actuating movement. For example, the actuating actuator 12 can be actuated hydraulically, wherein the actuating actuator 12 has an actuating piston 13 which, when acted upon by a fluid pressure, carries out a stroke movement and transmits the latter as the actuating movement to the shift lever 10. The shift lever 10 is rotated about the axis of rotation A1, wherein the rotating movement of the shift lever 10 is converted via the connecting rod 11 into a linear movement of the locking catch 9 along the locking catch axis A2.

In order to guide the locking catch 9 between the release position F and the locking position S, the parking lock 1 has a guide device 14 which remains stationary during the conversion of the shift movement, for example on a housing of the vehicle transmission or of the electric drive or of the actuating actuator 12. The guide device 14 is designed, for example, as a guide plate which has a ramp rising from the release position F into the locking position S for guiding the locking catch 9.

Furthermore, the detent pawl 4 has a locking portion 15 which serves for contact with the locking catch 9 in the locking position S and for the locking catch 9 to run onto during an implementation of the shift movement. The detent pawl 4 has a main body 16 which is designed in the form of a lever arm, wherein the main body 16 in an installation situation comprises a mounted end and a free end. The bearing portion 7 is arranged at the mounted end and the locking portion 15 at the free end. The main body 14 with its longitudinal extent defines a longitudinal axis A3, wherein the locking catch 9 and the shift lever arrangement 8, in particular the connecting rod 11, are aligned axially to the longitudinal axis A3.

During a movement of the locking catch 9 from the release position F into the locking position S, the locking catch 9 runs in the longitudinal direction on the guide device 14 and on the locking portion 15, wherein the detent pawl 4 enters the locking toothing 3 by way of the latching portion 5. The latching portion 5 therefore engages in the locking toothing 3 in the locking position S such that the parking lock wheel 2 is blocked against rotation. At the same time, the locking catch 9 is clamped in the locking position S between the guide device 14 and the locking portion 15 such that the detent pawl 4 is secured against being pushed out of the locking toothing 3. During a movement of the locking catch 9 from the locking position S into the release position F, the locking catch 9 runs in a reverse sequence on the guide device 14 and the locking portion 15, wherein the detent pawl 4 exits the locking toothing 3 by way of the latching portion 5. The latching portion 5 is therefore disengaged from the locking toothing 3 in the release position F, and therefore the parking lock wheel 2 is rotatable.

Figure 2:
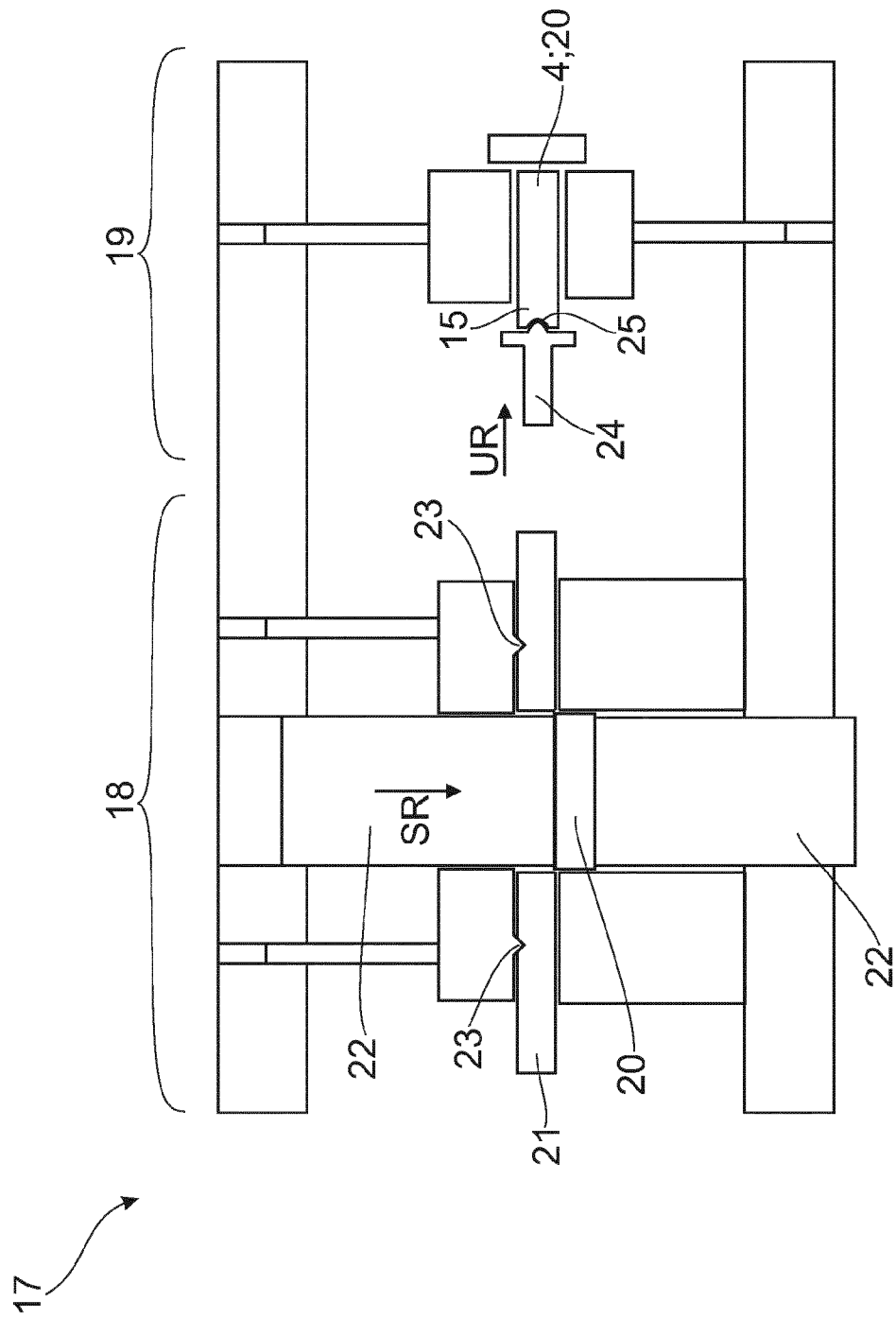
FIG. 2 shows a schematic illustration of an apparatus for producing a detent pawl for the parking lock according to FIG. 1 as an exemplary embodiment of the invention.

FIG. 2 shows, in a highly schematized illustration, an apparatus 17 for producing the detent pawl 4 as an exemplary embodiment of the invention. The apparatus 17 has a cutting step 18 and a forming step 19. For example, the cutting step 18 and the forming step 19 can be jointly coupled to each other via a transverse slider, not illustrated. The cutting step 18 is in particular a precision cutting step, wherein, for this purpose, a detent pawl blank 20 of the detent pawl 4 is cut out a feedstock 21, for example a sheet metal strip, in a cutting direction SR by a cutting tool 22, wherein the feedstock 21 is held by a V-shaped projection 23 during the cutting operation. The finished detent pawl blank 20 preferably has a constant detent pawl width over its entire component length.

Subsequently, the detent pawl blank 20 is transferred, for example by means of the transverse slider, from the cutting step 18 into the forming step 19. The forming step 19 comprises a forming tool 24, wherein the forming tool 24 forms the detent pawl blank 20 in a forming direction UR in order to form the detent pawl 4. A depression 25 is introduced into the locking portion 15 in the forming direction UR by the forming tool 24, wherein the forming direction UR is directed transversely, in particular perpendicularly, to the cutting direction SR. The forming tool 24 is designed, for example, as a stamping punch. For the forming, the forming tool 24 is advanced in the forming direction UR to the detent pawl blank 20, wherein the detent pawl blank 20 is arranged and/or fixed fixedly in the forming step 19. The detent pawl blank 20, in particular at least the locking portion 15, can be supported in the forming step 19 counter to the forming direction UR such that the forces acting on the detent pawl blank 20 can be dissipated. In addition, the detent pawl blank 20 can be clamped between a plurality of clamping plates in order to restrict the degrees of freedom of the detent pawl blank 20 and to control an accumulation of material produced by the forming.

By means of the depression 25 which is introduced into the locking portion 15, a receptacle is produced for the locking catch 9, and therefore the latter, in particular in the locking position S, is accommodated or centered in a stable position on the locking portion 15. The depression 25 also serves for increasing the contact surface between the locking catch 9 and the locking portion 15 under the action of a load, wherein the Hertzian stress and therefore the wear of detent pawl 4 and locking catch 9 can be significantly reduced on account of the increased contact surface.

Figure 3:
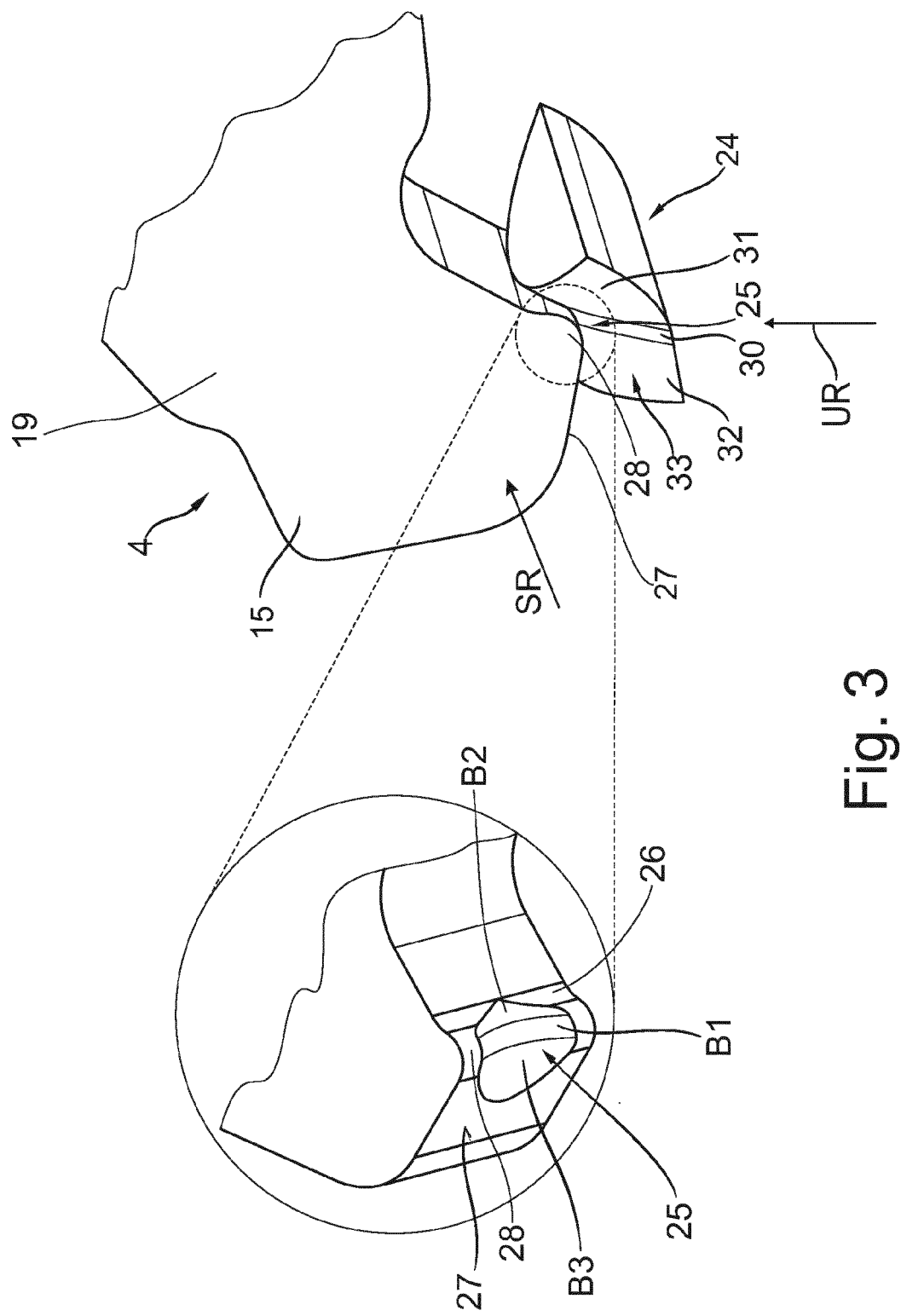
FIG. 3 shows a perspective illustration of the detent pawl with a forming tool of the apparatus from FIG. 2.

FIG. 3 shows the detent pawl 4 with the forming tool 24 of the forming step 19 from FIG. 2 in a perspective illustration. The locking portion 15 has a lifting surface 26 and a free floating surface 27, wherein the lifting surface 26 and the free floating surface 27 are connected to each other via a locking radius 28, as viewed in a side view. The lifting surface 26 and the free floating surface 27 preferably extend perpendicular to a common plane which is preferably formed by a flat side 29 of the locking portion 15. The lifting surface 26 serves for the locking catch 9 to run onto it during the shift movement and, for this purpose, is provided with a lifting slope such that a ramp-like run-on for the locking catch 9 is formed by the lifting surface 26. The effect of the locking catch 9 running onto the lifting surface 26 is therefore that an axial movement of the locking catch 9 is converted into a pivoting movement of the detent pawl 4 about the axis of rotation D, as shown in FIG. 1. The free floating surface 27 is provided with a free floating slope such that an undercut is produced on the locking portion 15 by the free floating surface 27.

The forming tool 24 has a load portion 30, a guide portion 31 and a free floating portion 32 which together define a forming contour 33 of the forming tool 24. In order to form the depression 25, the forming tool 24 is pressed with its forming contour 33 in the forming direction UR into the locking portion 15, wherein, as shown in the detailed view D, the load portion 30 defines a load region B1, the guide portion 31 defines a guide region B2, and the free floating portion 32 defines a free floating region B3 of the depression 25. The load region B1 is arranged at the location of the locking radius 28, wherein the guide region B2 extends in portions from the load region B1 into the lifting surface 26, and wherein the free floating region B3 extends in portions from the load region B1 into the free floating surface 27.

During a movement of the locking catch 9 from the release position F into the locking position S, said locking catch runs over the lifting surface 26 into the guide region B2 of the depression 25 and at least in portions out of the depression 25 in the free floating region B3. The guide region B2 defines an inlet for the locking catch 9 such that the locking catch 9 is guided into the load region B1 via the guide region B2. The free floating region B3 defines an outlet for the locking catch 9 such that the locking catch 9 is guided out of the load region B1 via the free floating region B3. In the locking position S, the locking catch 9 is arranged in the load region B1 such that the locking portion 15 is supported in the load region B1 on the locking catch 9.

The forming contour 33 has a continuously curved contour profile, as viewed in a cross section, and therefore the depression 25 can be provided, for example, with a beveling contour which is adapted to an outside diameter of the locking catch 9. For example, it can be provided that the guide portion 31 has a different radius of curvature in relation to the load portion 30 and/or the free floating portion 32. The radius of curvature of the guide portion 31 can be selected to be larger than the radius of curvature of the load portion 30 and/or of the free floating portion 32. For example, the load portion 30 and the free floating portion 32 have a radius of R8.5 and the guide portion 31 a radius of R12.

FIG. 4 shows a schematic longitudinal section, in particular along the longitudinal axis A3, of the locking portion 15 and of the forming tool 24 as a further exemplary embodiment of the invention. As viewed in the longitudinal section, the forming contour 33 roughly follows the contour of the locking portion 15. The forming contour 33, as viewed in the longitudinal section, has a contour profile which, during the forming, forms a flowing and/or continuous transition from the load region B1 to the guide region B2 and from the load region B1 to the free floating region B3. It can therefore be ensured that the locking catch 9 cannot catch when the shift movement is carried out.

In the illustration which is shown, the guide portion 31 is dimensioned in such a manner that, during the forming, a guide region B2 is formed which extends as far as possible over the entire lifting slope of the lifting surface 26. The locking catch 9 can therefore preferably be guided in the guide region B2 as it runs onto the lifting surface 26 during the actuating movement.

FIGS. 5a, b each show a schematic longitudinal section, in particular along the longitudinal axis A3, of the locking portion 15 and of the forming tool 24 as a further exemplary embodiment of the invention. As can be gathered from FIG. 5a, the locking portion 15 has, at the location of the locking radius 28, a supply of space 34 which is produced by abrasion of material, in particular in the cutting step 18. A further radius 35 is formed which defines a transition to the lifting surface 26. By forming the locking portion 15, as illustrated in FIG. 5b, the load region B1 is formed between the locking radius 28 and the further radius 35. By means of the supply of space 34, an accumulation of material at the transition to the lifting slope 26 can be reduced.

FIGS. 6a, b, c each show a schematic cross section of the forming tool 24 as a further exemplary embodiment of the invention. The forming tool 24 shown in FIG. 6a has laterally an offset contour profile, wherein the resultantly formed lateral shoulders 36a,b define an end position for the forming tool 24. During the forming, the forming tool 24 is pressed in the forming direction UR into the locking portion 15 until the forming tool 24 with the lateral shoulders 36a,b lies on the locking portion 15, in particular on the locking radius 28. In addition, a forming depth can be defined by the shoulders 36a, b, wherein, during the forming, the forming depth is reached when the forming tool 24 lies with the shoulders 36a, b on the locking portion 15.

The forming tool 24 shown in FIG. 6b has a laterally flattened contour profile, wherein the resultantly formed lateral free regions 37a, b define an end position for the forming tool 24. In addition, the free regions 37a, b serve to ensure an additional space for the accumulation of material produced during the forming. In addition, for example, a forming depth can be defined by the free region 37a, b, wherein, during the forming, the forming depth is reached when the forming tool 24 lies with the free region 37a, b on the locking portion 15.

The forming tool 24 shown in FIG. 6c has a continuously curved contour profile. For example, the forming tool 24 has a tool width which is greater than or equal to the pawl width. A depression 25 which extends over the entire pawl width can therefore be produced.

REFERENCE SIGNS

1 Parking lock
2 Parking lock wheel
3 Locking toothing
4 Detent pawl
5 Latching portion
6 Bearing bolt
7 Bearing portion
8 Shift lever arrangement
9 Locking catch
10 Shift lever
11 Connecting rod
12 Actuating actuator
13 Actuating piston
14 Guide device
15 Locking portion
16 Main body
17 Apparatus
18 Cutting step
19 Forming step
20 Detent pawl blank
21 Feedstock
22 Cutting tool
23 V-shaped projection
24 Forming tool
25 Depression
26 Lifting surface
27 Free floating surface
28 Locking radius
29 Flat side
30 Load portion
31 Guide portion
32 Free floating portion
33 Forming contour
34 Supply of space
35 Further radius
36a, b Shoulder
37a, b Free region
D Detailed view
F Release position
S Locking position
A1 Axis of rotation
A2 Locking catch axis
A3 Longitudinal axis
B1 Load region
B2 Guide region
B3 Free floating region
F1 Spring force
SR Cutting direction
UR Forming direction

The invention claimed is:
1. A method for producing a detent pawl having a latching portion configured to engage in a locking toothing, a bearing portion configured to rotatably mount the detent pawl about an axis of rotation, and having a locking portion configured to contact a locking catch which is movable along the detent pawl, comprising the following steps:
  providing a detent pawl blank;
  providing a forming tool with a forming contour, wherein the forming contour has a load portion and a guide portion;

forming the detent pawl blank by the forming tool in a forming direction, wherein a depression configured to receive the locking catch is produced on the locking portion, wherein the load portion defines a load region of the depression configured to support the locking catch in a locking position, and wherein the guide portion defines a guide region of the depression configured to guide the locking catch during an actuating movement, wherein the locking portion has a lifting surface and a free floating surface, wherein the lifting surface and the free floating surface are connected to each other via a locking radius, wherein the load region is introduced by the load portion at a location of the locking radius, and wherein the guide region is introduced into the lifting surface by the guide portion.

2. The method as claimed in claim 1, wherein the forming contour has a free floating portion, wherein a free floating region of the depression is introduced into the free floating surface by the free floating portion.

3. The method as claimed in claim 2, wherein the detent pawl blank is produced in a cutting step by cutting in a cutting direction, and wherein the depression is produced in a forming step by forming in the forming direction, wherein the forming direction is directed transversely or identically or counter to the cutting direction.

4. The method as claimed in claim 3, wherein the detent pawl blank is produced in the cutting step by precision cutting.

5. The method as claimed in claim 4, wherein the depression is produced in the forming step by compression forming.

6. The method as claimed in claim 3, wherein the depression is produced in the forming step by compression forming.

7. The method as claimed in claim 2, wherein the forming contour has a continuous contour profile, as viewed in a longitudinal section, wherein a continuous and/or flowing transition between the individual regions is produced during the forming.

8. The method as claimed in claim 2, wherein the forming contour has a curved contour profile, as viewed in a cross section, wherein at least the load portion and the guide portion each have a different radius of curvature and/or curvature profile.

9. The method as claimed in claim 1 wherein the forming tool has a flattened and/or offset contour profile on both sides, as viewed in a cross section, configured to contact with the locking radius.

10. A method for producing a detent pawl having a latching portion configured to engage in a locking toothing, a bearing portion configured to rotatably mount the detent pawl about an axis of rotation, and having a locking portion configured to contact a locking catch which is movable along the detent pawl, comprising the following steps:
providing a detent pawl blank;
providing a forming tool with a forming contour, wherein the forming contour has a load portion and a guide portion;
forming the detent pawl blank by the forming tool in a forming direction, wherein a depression configured to receive the locking catch is produced on the locking portion, wherein the load portion defines a load region of the depression configured to support the locking catch in a locking position, and wherein the guide portion defines a guide region of the depression configured to guide the locking catch during an actuating movement, wherein the depression is produced on the locking portion over the entire width of the pawl.

* * * * *